United States Patent [19]

Urbush

[11] 3,992,778

[45] Nov. 23, 1976

[54] ELECTRIC CLIPPER

[75] Inventor: Richard L. Urbush, Racine, Wis.

[73] Assignee: Andis Clipper Company, Racine, Wis.

[22] Filed: Apr. 28, 1975

[21] Appl. No.: 572,056

[52] U.S. Cl. .................................... 30/216; 30/220; 310/47

[51] Int. Cl.[2] ...................... B26B 19/02; H02K 5/14

[58] Field of Search ................ 30/216, 220; 310/51, 310/47, 50; 74/50, 55

[56] References Cited

UNITED STATES PATENTS

| | | | |
|---|---|---|---|
| 2,292,453 | 8/1942 | LaMere | 30/216 |
| 2,458,200 | 1/1949 | Renfroe | 30/216 X |
| 3,002,794 | 10/1961 | Bluemink | 310/51 |
| 3,119,942 | 1/1964 | Luther | 30/216 X |
| 3,463,954 | 8/1969 | Latta | 310/51 X |
| 3,483,407 | 12/1969 | Frohmuller | 310/51 |
| 3,589,007 | 6/1971 | Walton | 30/220 |

*Primary Examiner*—Al Lawrence Smith
*Assistant Examiner*—J. C. Peters
*Attorney, Agent, or Firm*—Michael, Best & Friedrich

[57] ABSTRACT

Disclosed herein is a hair clipper comprising an outer housing of electrically insulating material, a motor located in the housing and including a field structure, an armature structure including a shaft, and bearing assemblies spaced axially of the armature structure and engaging the armature structure and the field structure for supporting the armature structure for rotation relative to the field structure, each of said bearing assemblies including a bearing and a bearing sleeve fabricated of electrically insulating material and located to isolate the bearing from one of the armature structure and the field structure, and screws mounting the field structure from the outer housing.

Located at one end of the housing is a blade set connected to the field structure and including a first or stationary blade fixed relative to the field structure, a second blade movable relative to the first blade and including thereon a driven element formed of electrically insulating material and engaged by a drive member carried by the armature shaft to cause reciprocating movement of the second blade relative to the first blade in response to rotation of the shaft, which drive member is located in co-axial, surrounding relation to an eccentric end portion of the shaft and is supported by an annular bearing located between and engaging the end portion and the drive member to afford relative rotation therebetween.

22 Claims, 9 Drawing Figures

Fig. 1
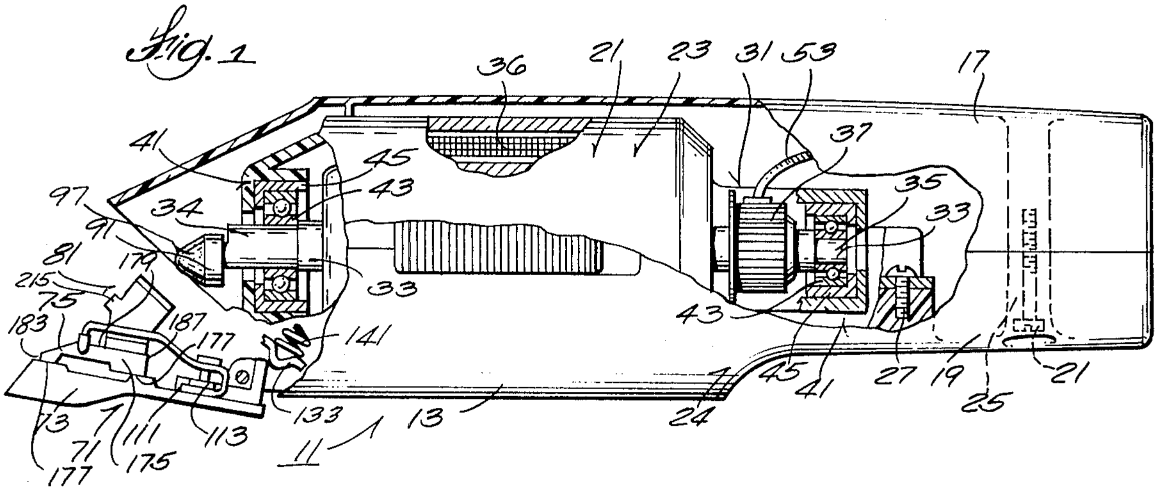
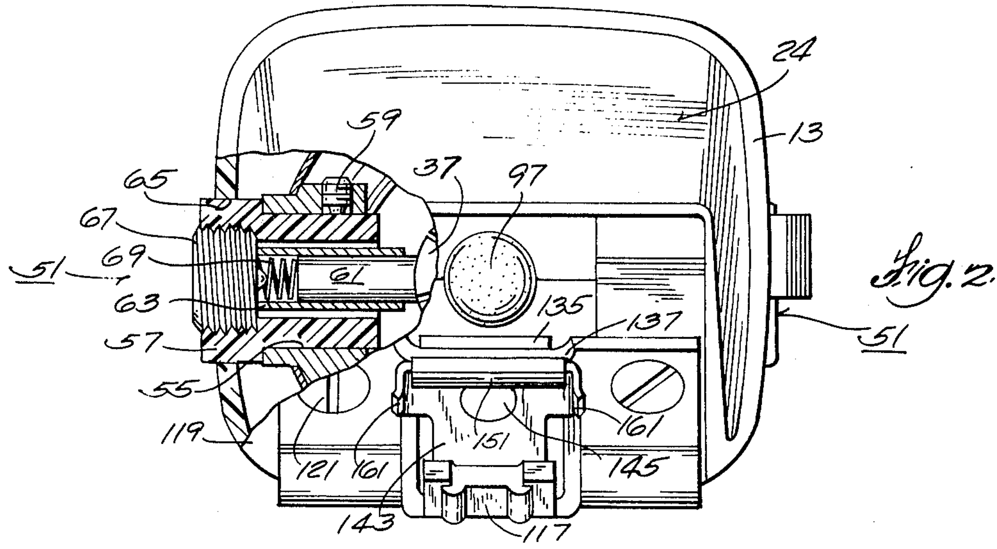
Fig. 2
Fig. 3
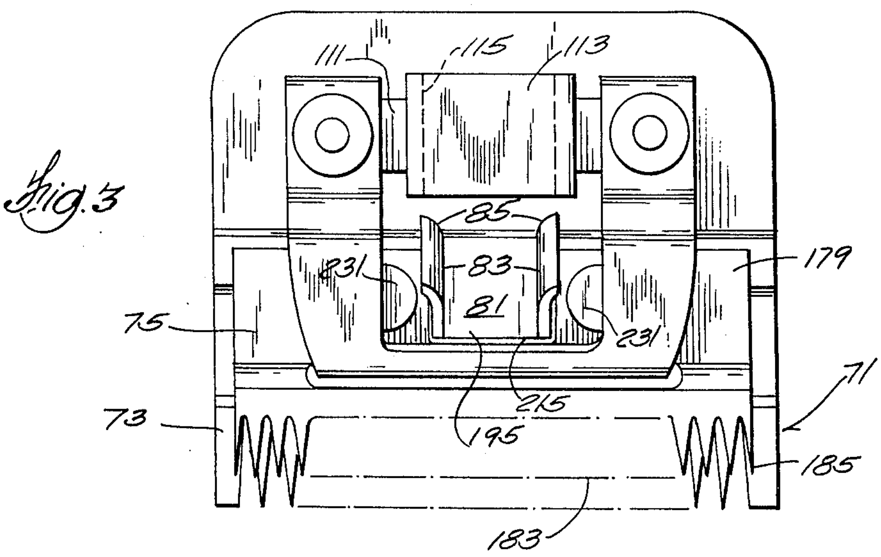

Fig. 4
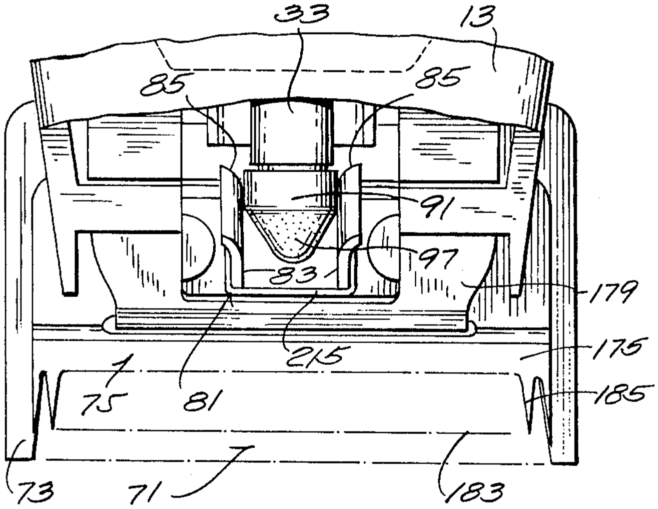
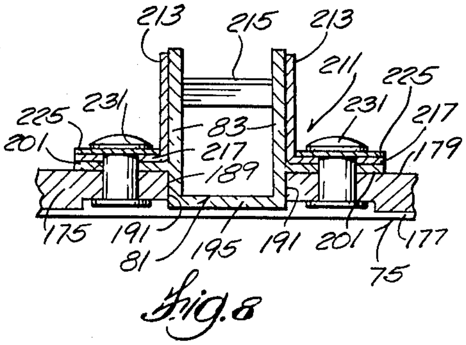
Fig. 8
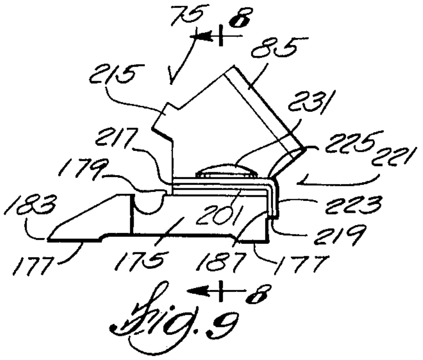
Fig. 9
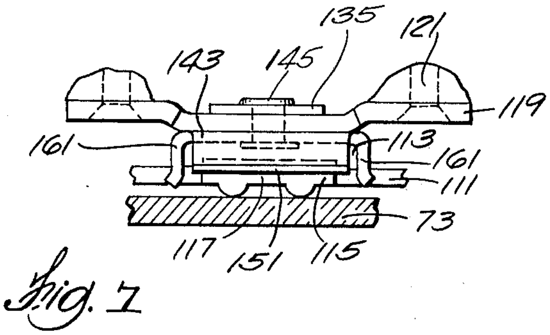
Fig. 7
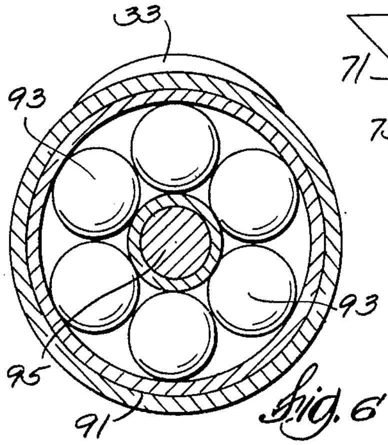
Fig. 6
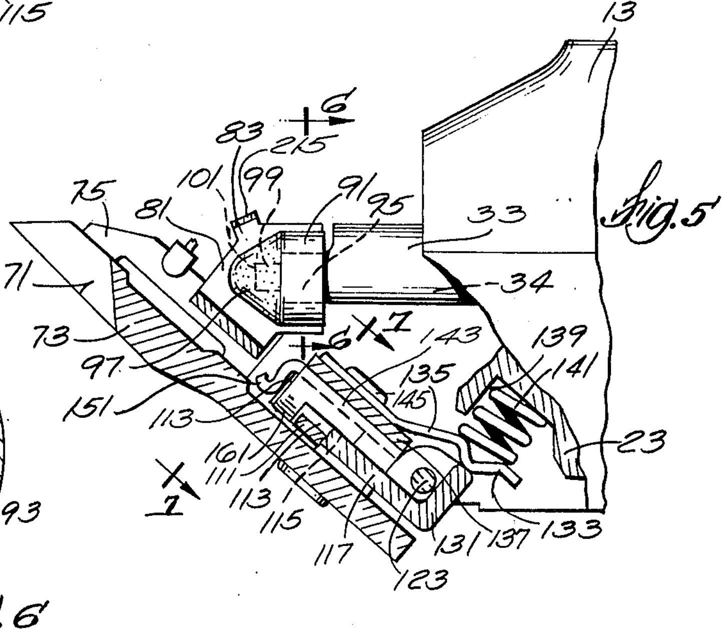
Fig. 5

ELECTRIC CLIPPER

BACKGROUND OF THE INVENTION

The invention relates generally to hair clippers and to electrically operated hair clippers.

The invention also relates to arrangements for electrically insulating an electrically operated hair clipper.

The invention also relates to arrangements for reciprocating the movable blade of a hair clipper blade set in response to rotary movement of the output shaft of an electric motor.

The invention also relates to spring arrangements for releasably and selectively retaining a blade set holding tongue or pivot arm in an operating position and in a second position affording connection and disconnection of the blade set relative to the tongue or pivot arm.

The invention also relates to arrangements for preventing relative movement between the stationary blade of a blade set and a blade set mounting tongue or pivot arm.

SUMMARY OF THE INVENTION

The invention provides a hair clipper comprising an outer housing of electrically insulating material, a motor located in the housing and including a field structure, an armature structure including a shaft, and bearing assemblies spaced axially of the armature structure and engaging the armature structure and the field structure for supporting the armature structure for rotation relative to the field structure, each of the bearing assemblies including a bearing and a bearing sleeve fabricated of electrically insulating material and located to isolate the bearing from one of the armature structure and the field structure, and means connecting the field structure and the outer housing.

In an embodiment of the invention, the field structure includes a permanent magnet and the bearing sleeves are fabricated of resilient material and are located between the bearings and the field structure.

The invention also provides a hair clipper including a housing, a motor located in the housing and having a rotatable shaft including a first portion and an end portion projecting from the first portion in eccentric relation to the rotary axis of the first portion, a drive member located in co-axial, surrounding relation to the end portion, an annular bearing between and engaging the end portion and the drive member to afford relative rotation therebetween, and means retaining the drive member on the end portion in co-axial, surrounding relation to the end portion. Preferably the bearing is a ball bearing.

In an embodiment of the invention, the drive member has an outer diameter and the means retaining the drive member on the end portion in co-axial, surrounding relation comprises a tapered nose element which is preferably fabricated of plastic and has a base with diameter approximately equal to the outer diameter of the drive member, and means securing the nose element on the end portion.

Also in an embodiment of the invention, the hair clipper includes a blade set connected to one of the housing and the field structure and including a first blade fixed relative to one of the housing and field structure, a second blade movable relative to the first blade and including thereon a driven element formed of electrically insulating material and engaged by the drive member to cause reciprocating movement of the second blade relative to the first blade in response to rotation of the shaft.

The invention also provides a hair clipper comprising a housing assembly including a recess, a blade set having a stationary blade with means thereon defining a groove, a blade set mounting assembly including a mounting plate fixed to the housing assembly, a tongue removably extending into the groove, means on the tongue and on the mounting plate affording pivotal movement of the tongue relative to the mounting plate between a first position permitting insertion and withdrawal of the tongue relative to the groove and a second position preventing such insertion and withdrawal, and spring means secured to the mounting plate and including a portion engaging the tongue for selectively and releasable holding the tongue in the first and second positions, and a spring in the recess bearing, at one end, against the housing assembly and bearing, at the other end, against the portion of the spring means to augment the action of the spring means.

The invention also provides a hair clipper comprising a housing assembly, a blade set having a stationary blade with means thereon defining a groove, a blade set mounting assembly including a mounting plate fixed to the housing assembly, a tongue movably carried by the mounting plate and removably extending into the groove, and a spring retainer mounted on the mounting plate and including means releasably griping the means defining the groove to releasably clamp the blade set on the tongue.

In an embodiment of the invention, the means on the stationary blade defining a groove comprises a mounting bracket having a raised central portion, with a first edge and a pair of spaced edges, and the spring retainer includes a lip releasably engaging the first edge of the raised central portion and further includes a pair of spaced wings releasably clamping the pair of spaced edges of the raised central portion.

The invention also provides a movable blade for a hair clipper blade set, which movable blade comprises a blade member having a forward edge with a series of teeth extending therealong, a rearward edge, and an upper surface located between the forward and rearward edges and having therein a recess with second and third edges extending in laterally spaced relation to each other generally perpendicularly to the forward and rearward edges, a yoke member which includes a main body of generally U-shape including first and second walls extending in laterally spaced relation to each other and a web connecting the first and second walls, which also includes first and second flange portions respectively extending in laterally outwardly coplanar relation from the first and second walls, and which extends in the recess with the first and second walls extending adjacent to the second and third edges and upwardly therefrom and with the flange portions in overlying engagement with the upper surface of the blade member, a brace member which comprises first and second wall portions extending in laterally spaced parallel relation to each other, a bridge portion connecting the wall portions, first and second flange portions respectively extending in laterally outward coplanar relation from the first and second wall portions, and respective tabs extending downwardly from the flange portions in generally perpendicularly relation thereto, and which is located with the first and second wall portions in laterally outwardly overlying engagement with the first and second walls of the yoke member, with the flange portions of the brace member in overlying engagement with the flange portions of the yoke member, and with the bridge portion extending forwardly of the walls of the yoke member, and with the tabs in overlying engagement with the rearward edge of the blade member, and means fixedly securing together in assembled relation the blade member, the yoke member, and the brace member.

In an embodiment of the invention, the movable blade further includes a reinforcing member which includes an elongated portion having an upper edge and first and second flange portions extending from the upper edge in laterally spaced relation to each other, and which is located with the elongated portion in overlying engagement with the tabs of the brace portion, with the flange portions in overlying engagement with the flange portions of the brace member, and with the means fixedly securing the blade member, the yoke member, and the brace member also fixedly securing the reinforcing member in assembled relation to the blade member, the yoke member, and the brace member.

One of the principal features of the invention is the provision of an electric hair clipper having a permanent magnet motor including an armature structure mounted for rotation within a field structure by bearing assemblies which provide electrical insulation.

Another of the principal features of the invention is the provision of a hair clipper including a rotably mounted annular drive member which is eccentrically mounted for rotation on a motor output shaft, which is fabricated of metal, and which operably engages a plastic element fixed on a movable blade to effect reciprocation thereof relative to a stationary blade in response to output shaft rotation.

Another of the principal features of the invention is the provision in a hair clipper of an auxiliary spring to assist the action of a primary spring which selectively and releasably retains a blade set pivot arm or tongue in a first position permitting attachment and disattachment of a blade set thereon, and a second position in which the blade set is located for hair-clipping operation.

Still another of the principal features of the invention is the provision of a hair clipper including a spring retainer mounted on a blade set pivot arm or tongue for clampingly engaging a bracket on the stationary blade of a blade set so as to releasably prevent relative movement between the stationary blade and the pivot arm or tongue.

Other features and advantages of the embodiments of the invention will become known by reference to the following drawings, general description, and claims.

THE DRAWINGS

FIG. 1 is a side elevational view, partially broken away and in section, of a hair clipper embodying various of the features of the invention.

FIG. 2 is an enlarged front view of the hair clipper shown in FIG. 1 with the blade set removed.

FIG. 3 is a top plan view of the blade set incorporated in the hair clipper shown in FIG. 1.

FIG. 4 is a top plan view showing the drive arrangement for the blade set incorporated in the hair clipper shown in FIG. 1.

FIG. 5 is a fragmentary side elevational view, partially broken away and in section, of the drive arrangement for the blade set incorporated in the hair clipper shown in FIG. 1.

FIG. 6 is a sectional view taken along line 6—6 of FIG. 5.

FIG. 7 is a sectional view taken along line 7—7 of FIG. 5.

FIG. 8 is a cross sectional view taken along line 8—8 of FIG. 9.

FIG. 9 is a side elevational view of a blade member incorporated in the blade set included in the hair clipper shown in FIG. 1.

Before explaining the embodiments of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is an electrical hair clipper 11 which embodies various of the features of the invention and which includes a housing 13 which is constructed of electrically insulating material, such as plastic. Any suitable design can be employed and, in the illustrated construction, the housing comprises two sections or parts 17 and 19 which are connected together by a plurality of screws 21.

Located in the housing 13 is an electrical motor 21 which can be of various designs but which, preferably, is an alternating current permanent magnet motor. Thus, the motor 21 includes a field structure 23 which includes one or more permanent magnets but which is without electrical connection to a source of power. The field structure 23 is secured to and retained in the housing 13 to provide a housing assembly 24 by reason of engagement with a pair of upstanding bosses 25 which respectively threadably receive two of the screws 21 and by reason of an additional screw connections 27 between the field structure 23 and one of the housing sections 17 and 19.

Rotably mounted within the field structure 23 is an armature structure 31 including a shaft 33 having two axially spaced portions 34 and 35, a winding 36 carried by the shaft 33 between the portions 34 and 35, and a split comutator ring 37 which is also carried by the shaft 33 between the portions 34 and 35 and electrically connected to the winding 36.

Means are provided for rotatably mounting the armature structure 31 within the field structure 23 while, at the same time, electrically isolating and resiliently mounting the armature structure 31 from the field structure 23. While various arrangements can be employed, in the illustrated construction, such means comprises two axially spaced bearing assemblies 41 which extend between the field structure 23 and the armature shaft portions 34 and 35 and which respectively include a bearing 43 and a bearing sleeve 45.

The bearing sleeves 45 are constructed of electrically insulating material and, while the bearing sleeves 45 can be located between the bearings 43 and either of the armature shaft 33 and the field structure 23, it is preferred to locate the bearing sleeves 45 between the bearings 43 and the field structure 23 and to have the bearings 43 operatively engaged with the armature shaft portions 34 and 35. Preferably, the bearing sleeves 45 are of rubber or rubber-like material to permit compression during assembly, thus accommodating more liberal manufacturing tolerances.

In addition, the field structure 23 is fabricated to support a pair of brush assemblies 51 which are diametrically, oppositely located, which are operatively engaged with the split comutator ring 37, and which are electrically connected to a pair of suitable electrical leads 53 which enter into the housing 13. It is noted that these electrical connections are spaced from the field structure 23 and constitute the only connections of the motor 21 to a source of current.

More particularly, the field structure 23 includes two diametrically opposite bores 55 which respectively receive brush sleeves 57 of insulating material, such as plastic. The brush sleeves 57 are retained in the bores 55 of the field structure 23 by suitable means, such as set screws 59 and contain carbon brushes 61 and metalic brush holders 63 which are electrically connected to the electrical leads 53

In the illustrated construction, the brush sleeves 57 extend outward through registering apertures 65 in the housing 13 and are closed by caps or closures 67 which are respectively received in the brush sleeves 57 and which additionally serve to urge respective brush springs 69 against the brushes 61.

Located at one end of the housing 13 is a blade set 71 which includes a fixed blade or shear plate 73 fixed relative to the housing 13 and field structure 23 and a movable blade, plate or comb 75 reciprocable on and relative to the fixed plate 73. In this last regard, the blade set 71 preferably includes suitable means for guiding reciprocation of the movable blade 75 relative to the fixed blade 73. The movable blade 75 includes a generally flat blade member or plate 175 which includes forwardly and rearwardly co-planar lower surfaces 177 which bear against the fixed blade 73, an upper surface 179, a forward edge 183 with a series of teeth 185 cooperating with teeth on the forward edge of the fixed blade 73, and a rearward edge or surface 187 which preferably extends in generally perpendicular relation to the lower and upper surfaces 177 and 179. Located centrally of the blade member 179 is a recess 189 which extends from the upper surface 179, which can either be blind or extend completely through the blade member 175, and which includes two laterally or transversely spaced edges or walls 191 extending in generally perpendicular relation to the forward and rearward edges 183 and 185.

The movable blade 75 includes means for engaging the armature shaft 33 for reciprocating the movable blade 75 in response to rotation of the armature shaft 33 while, at the same time, electrically insulating the movable blade 75 from the armature shaft 33.

In this last regard, the movable blade 75 has fixedly extending therefrom an element which is driven by the armature shaft 33 and which is in the form of a yoke member 81 which is preferably constructed of electrically insulating material, such as plastic, and which includes a main portion which, in part, is located in the recess 191, and is generally of U-shape including first and second laterally spaced arms or walls 83 which extend upwardly from the edges 191 of the recess, together with a connecting web or wall 197 which extends between the lower edges of the walls 83 and is located in the recess 191. The arms or walls 83 respectively include rearwardly and upwardly extending edge portions or margins having arcuately laterally outwardly flaring terminal portions 85 extending toward the armature shaft 33.

The yoke member 81 also includes first and second flange portions 201 which respectively extend in laterally outward co-planar relation from the first and second walls 83 in overlying engagement with the upper surface 179 of the blade member 175.

The movable blade 75 also includes a brace member 211 which is preferably constructed of metal, such as spring steel, and which includes first and second laterally spaced parallel wall portions 213 located in laterally outwardly overlying relation to the walls 83 of the yoke member 81. Preferably, the wall portions 213 of the brace member 211 are co-extensive with the walls 83 of the yoke member 81 above the flange portions 201. In addition, the brace member 211 includes a bridge portion 215 which unites the wall portions 213 and which extends laterally therebetween from the forward edges of the wall portions 213 and above the lower edges of the wall portions 213 and forwardly of the forward edges of the walls 83 of the yoke member 81.

The brace member 211 further includes flange portions 217 which respectively extend laterally outwardly and in co-planar relation from the lower edges of the wall portions 213 and in overlying engagement with the flange portions 201 of the yoke member 81. In addition, the brace member 211 includes laterally spaced tabs 219 which extend respectively from the rearward edges of the flange portions 217 in generally perpendicular relation thereto and in overlying engagement with the rearward surfaces 187 of the blade member 175.

In addition, the movable blade 75 preferably includes a reinforcing member 221 which is fabricated of metal, such as spring steel. The reinforcing member 221 includes an elongated portion 223 which overlies the spaced tabs 219 of the brace member 211, together with a pair of laterally spaced flange portions 225 which extend from the upper edge of the elongated portion 223 in generally perpendicular relation thereto and in overlying engagement with the flange portions 217 of the brace member 211.

Means are provided for fixedly securing together the blade member 175, the yoke member 81, the brace member 211, and the reinforcing member 221. While various arrangements can be employed, in the illustrated construction, such means comprises a pair of rivets 231 which extend through the flange portions 225 of the reinforcing member 221, through the flange portions 201 of the yoke member 81 and through the body of the blade member 175.

Extending between the arms or walls 83 for engagement therebetween is an annular drive shaft member 91 which is driven by the armature shaft 33, which is preferably of metallic construction, such as stainless steel, and which has an outer surface in engagement with and between the arms 83. The drive member 91 also includes an inner surface in engagement with a bearing 93 which, in turn, is engaged on a portion 95 of the armature shaft extending in eccentric relation to the adjacent armature shaft portion 34 supported by one of the bearing assemblies 41. Preferably the bearing 93 is a ball bearing.

The annular drive member 91 is retained on the shaft portion 95 by a nose element or member 97 which is preferably constructed of electrically insulating material, such as plastic, and which is generally conical in shape so as to guide entrance of the nose member between the yoke arms 83 and which has a base with a diameter approximately equal to the outer diameter of the drive member 91 so as to restrain axial outward movement of the drive member 91 into engagement between the arms 83.

Suitable means are provided for retaining the nose member 97 on the end of the eccentric armature shaft portion 95. While various arrangements could be employed, in the illustrated construction, such means comprises a threaded stud on one of the nose member 97 and the eccentric armature shaft portion 95 and a threaded recess receiving the stud on the other of the nose member 97 and the shaft portion 95. Specifically, in the illustrated construction, the eccentric shaft portion 95 includes a threaded projection 99 and the nose member 97 includes a threaded recess 101 receiving the threaded projection 99.

The connection of the blade set 71 and particularly the fixed blade 73, to the housing 13 and field structure 23 permits releasable attachment of the blade set 71 on the hair clipper 11. In this regard, the blade set attachment means comprises a bracket 111 which is fixed on the stationary blade or shear plate 73 and which includes a raised central portion 113 defining between the bracket 111 and the shear plate 73, a groove or slot 115 adapted to receive a tongue or pivot arm 117 carried on a mounting plate 119 fixed to one or both of the housing 13 and field structure 23 by suitable means, such as a pair of screws 121. Further in this last regard, the tongue or pivot arm 117 is carried by the mounting plate 119 about a hinge pin 123 for movement between a first position affording insertion and withdrawal of the tongue 117 relative to the groove or slot 115 and an operating position in which the blade set 71 is located for engagement of the rotatable annular drive member 91 between the yoke arms 83. As indicated earlier, during movement of the tongue 117 from the first position to the operating position, the flared terminal portion 85 of the yoke arms 83 and the conical shape of the nose member 97 facilitate insertion of the drive member 91 between the yoke arms 83.

Means are provided for selectively and releasably retaining the pivot arm or tongue 117 in either of the first and operating positions. While various arrangements are possible, in the illustrated construction, the tongue or pivot arm 117 includes rearwardly of the hinge pin 123, an upwardly extending flange 131 which is engaged by a downwardly convex end portion 133 of a biasing spring 135 which is fixed to the top of a raised central portion 137 of the mounting plate 119. In operation, engagement of the curved portion 133 of the spring 135 with the flange 131 serves to releasably retain the tongue or pivot arm 117 in either of the first or operating positions.

Means are provided on one or both of the field structure 23 and housing 13 for augmenting the action of the biasing spring 135. In this regard, in the illustrated construction, the housing 13 is formed to expose the field structure 23 which, in turn, is provided with a recess 139 which receives a helical compression spring 141 which, at its outer end, bears against the top side of the downwardly convex portion 133 of the biasing spring 135 so as to increase the force applied by the biasing spring 135 to releasably hold the tongue or pivot arm 117 in either of its two positions. Employment of the helical spring 141 also serves to partially relieve the loading on the biasing spring 135 and to thereby increase the life of the biasing spring 135. If desired, as already indicated, the helical spring 141 could be contained in a recess in the housing 13.

The mounting plate 119 also has fixed, on the upper surface of the raised central portion 137, a spring retainer 143 which is adapted to grasp the central portion 113 of the bracket 111 on the stationary blade 73 to releasably prevent relative movement between the tongue or pivot arm 117 and the stationary blade 73. In this regard, the spring retainer 143 is fixed on the mounting plate by a rivet 145 which also fixes the biasing spring 135.

In order to releasably grip the stationary blade bracket 111, the spring retainer 143 includes an outer lip 151 which is adapted, when the blade set 71 is received on the tongue 117, to grip the edge 153 of the stationary blade bracket 111 remote from the hinge pin 123 so as to releasably clamp or grip the stationary blade bracket 111 against a shoulder 153 formed on the tongue 117 adjacent to the hinge pin 123.

In addition, the spring retainer 143 includes two laterally spaced wings 161 which are adapted to releasably grip or clamp therebetween the side edges 163 of the raised central portion 113 of the stationary blade bracket 111 so as to prevent lateral movement of the stationary blade 73 relative to the tongue 117 while, at the same time, avoiding interference with ease of insertion and withdrawal of the tongue 117 relative to the groove 115. In this regard, it is noted that withdrawal and insertion of the tongue 117 relative to the groove 115 occurs when the tongue or pivot arm 117 is in the first position and that the spring retainer 143 releasably grips the raised central portion 113 of the stationary blade bracket 111 incident to movement of the tongue 117 to the operating position.

Thus, when the tongue 117 is in the operating position, the stationary blade 73 is firmly but releasably held stationary relative to the field structure 23 and housing 13 as a result of the spring retainer 143 releasably clamping the stationary blade 73 to the tongue 117 and as a result of the action of the springs 135 and 141 which firmly but releasably hold the tongue or pivot arm 117 in the operating position. In addition, when the tongue is in the first position, the tongue 117 can be easily inserted or withdrawn from the groove 115 on the stationary blade 73.

It is noted that the motor is double insulated from the user as both the bearing sleeves 45 and the housing 13 serve to electrically insulate the armature structure 31 from the hand of the user holding the hair clipper 11. In addition, the drive from the armature structure 31 to the blade set 71 is electrically insulated as the annular drive member 91 operatively engages the plastic yoke member 81. Still further, wear is reduced due to engagement of the metallic drive member 91 with the plastic yoke member 81 and because the annular drive member 91 is freely rotatable on the eccentric portion 95 of the armature shaft 33.

Various of the features of the invention are set forth in the following claims.

What is claimed is:

1. A hair clipper comprising an outer housing of electrically insulating material, a motor located in said housing and including a field structure, an armature structure including a shaft having a first portion and an end portion projecting from said first portion in eccentric relation to the axis of said first portion, bearing assemblies spaced axially of said armature structure and engaging said armature structure and said field structure for rotatably supporting said armature structure for rotation relative to said field structure, each of said bearing assemblies including a bearing and a bearing sleeve fabricated of electrically insulating material and located to isolate said bearing from one of said armature structure and said field structure, one of said bearing assemblies being engaged with said first portion of said shaft, means connecting said field structure and said outer housing, a drive member located in co-axial, surrounding relation to said end portion of said shaft, an annular bearing between and engaging said end portion and said drive member to afford relative rotation therebetween, and means retaining said drive member on said end portion in co-axial, surrounding relation to said end portion including a tapered nose element having a base engaging said drive member, and means securing said nose element on said end portion.

2. A hair clipper in accordance with claim 1 wherein said field structure includes a permanent magnet.

3. A hair clipper in accordance with claim 1 wherein said bearing sleeves are located between said bearings and said field structure.

4. A hair clipper in accordance with claim 1 wherein said bearing sleeves are fabricated of resilient material.

5. A hair clipper in accordance with claim 1 and further including a blade set connected to one of said housing and said field structure and including a first blade fixed relative to one of said housing and said field structure, a second blade movable relative to said first blade and including thereon a driven element formed of electrically insulating material and engaged by said drive member to cause reciprocating movement of said second blade relative to said first blade in response to rotation of said shaft.

6. A hair clipper in accordance with claim 1 wherein said field structure includes two diametrically opposed bores, respective brush sleeves formed of electrically insulating material located in said bores, and respective brush assemblies located in said brush sleeves.

7. A hair clipper in accordance with claim 6 wherein said housing includes two diametrically opposed apertures and wherein said brush sleeves extend into said apertures to afford access to said brush assemblies from the exterior of said housing.

8. A hair clipper in accordance with claim 6 wherein a pair of electrical wires are respectively connected to said brush assemblies interiorly of said housing and comprise the only electrical connection to said motor.

9. A hair clipper in accordance with claim 1 wherein said nose element is secured on said end portion for common rotation of said nose element and said end portion.

10. A hair clipper in accordance with claim 1 wherein said means securing said nose element on said end portion includes a threaded projecting stud on one of said nose element and said end portion, and a threaded recess receiving said threaded stud on the other of said end portion and said recess.

11. A hair clipper in accordance with claim 1 wherein said nose element is of plastic material.

12. A hair clipper in accordance with claim 1 wherein said bearing comprises a ball bearing.

13. A hair clipper including a housing, a motor located in said housing and having a rotatable shaft including a first portion and an end portion projecting from said first portion in eccentric relation to the rotary axis of said first portion, a drive member mounted in co-axial, surrounding relation to said end portion for relative rotation therebetween, and means retaining said drive member on said end portion including a tapered nose element having a base engaging said drive member, and means securing said nose element on said end portion.

14. A hair clipper in accordance with claim 13 wherein said nose element is secured on said end portion for common rotation of said nose element and said end portion.

15. A hair clipper in accordance with claim 13 wherein said means securing said nose element on said end portion includes a threaded projecting stud on one of said nose element and said end portion, and a threaded recess receiving said threaded stud on the other of said end portion and said recess.

16. A hair clipper in accordance with claim 13 wherein said nose element is fabricated of plastic material.

17. A hair clipper in accordance with claim 13 wherein said bearing comprises a ball bearing.

18. A hair clipper in accordance with claim 13 wherein said motor includes a field structure fixed to said housing, and further including a blade set connected to one of said housing and said field structure and including a first blade fixed relative to one of said housing and said field structure, a second blade movable relative to said first blade and including thereon a driven element formed of electrically insulating material and engaged by said drive member to cause reciprocating movement of said second blade relative to said first blade in response to rotation of said shaft.

19. A hair clipper in accordance with claim 13 wherein said motor comprises a field structure fixed to said housing and including two diametrically opposed bores, respective brush sleeves formed of electrically insulating material located in said bores, and respective brush assemblies located in said brush sleeves.

20. A hair clipper in accordance with claim 19 wherein said housing includes two diametrically opposed apertures and wherein said brush sleeves extend into said apertures to afford access to said brush assemblies from the exterior of said housing.

21. A hair clipper in accordance with claim 19 wherein a pair of electrical wires are respectively connected to said brush assemblies interiorly of said housing and comprise the only electrical connection to said motor.

22. A hair clipper in accordance with claim 13 and further including an annular bearing between and engaging said end portion and said drive member.

* * * * *